(12) United States Patent
Costa De Beauregard et al.

(10) Patent No.: US 11,408,672 B2
(45) Date of Patent: Aug. 9, 2022

(54) SYNTHESIS GAS PRODUCTION PROCESS FOR THE IMPLEMENTATION OF A NATURAL GAS LIQUEFACTION

(71) Applicant: L'Air Liquide, Société Anonyme pour l'Etude et l'Exploitation des Procédés Georges Claude, Paris (FR)

(72) Inventors: Pierre Costa De Beauregard, Issy les Moulineaux (FR); Pascal Marty, Bry sur Marne (FR); Thomas Morel, Noisy le Grand (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 718 days.

(21) Appl. No.: 16/349,691

(22) PCT Filed: Nov. 14, 2017

(86) PCT No.: PCT/FR2017/053100
§ 371 (c)(1),
(2) Date: May 14, 2019

(87) PCT Pub. No.: WO2018/087496
PCT Pub. Date: May 17, 2018

(65) Prior Publication Data
US 2019/0277563 A1  Sep. 12, 2019

(30) Foreign Application Priority Data
Nov. 14, 2016 (FR) ....................... 1660986

(51) Int. Cl.
| | | |
|---|---|---|
| *F25J 1/00* | (2006.01) | |
| *B01D 53/04* | (2006.01) | |
| *B01D 53/14* | (2006.01) | |
| *B01D 53/75* | (2006.01) | |
| *B01D 53/86* | (2006.01) | |
| *C01B 3/38* | (2006.01) | |
| *C10L 3/10* | (2006.01) | |
| *F25J 1/02* | (2006.01) | |

(52) U.S. Cl.
CPC ........ *F25J 1/0022* (2013.01); *B01D 53/0438* (2013.01); *B01D 53/1475* (2013.01); *B01D 53/1493* (2013.01); *B01D 53/75* (2013.01); *B01D 53/8606* (2013.01); *C01B 3/38* (2013.01); *C10L 3/101* (2013.01); *C10L 3/103* (2013.01); *F25J 1/0229* (2013.01); *F25J 1/0242* (2013.01); *B01D 2252/204* (2013.01); *B01D 2253/116* (2013.01); *B01D 2256/24* (2013.01); *B01D 2257/304* (2013.01); *B01D 2257/504* (2013.01); *B01D 2257/80* (2013.01); *B01D 2259/40086* (2013.01); *B01D 2259/40088* (2013.01); *C01B 2203/0227* (2013.01); *C01B 2203/0233* (2013.01); *C01B 2203/1241* (2013.01); *C01B 2203/1258* (2013.01); *C01B 2203/1264* (2013.01); *C01B 2203/80* (2013.01); *C10L 2290/544* (2013.01); *F25J 2205/70* (2013.01); *F25J 2220/64* (2013.01); *F25J 2220/66* (2013.01); *F25J 2220/68* (2013.01); *F25J 2240/70* (2013.01)

(58) Field of Classification Search
None
See application file for complete search history.

(56) References Cited

U.S. PATENT DOCUMENTS

| | | | | |
|---|---|---|---|---|
| 5,124,140 A | * | 6/1992 | Okada ................ | C01B 3/38 423/652 |
| 5,685,890 A | * | 11/1997 | Okada ................ | C01B 3/38 48/214 A |
| 2004/0248999 A1 | * | 12/2004 | Briscoe ............... | F25J 1/021 518/703 |
| 2005/0025701 A1 | * | 2/2005 | Bhat .................. | B01J 23/6522 423/652 |
| 2012/0121497 A1 | * | 5/2012 | Terrien .............. | B01D 53/226 423/437.1 |
| 2012/0292574 A1 | * | 11/2012 | Terrien .............. | F25J 3/0266 252/373 |
| 2015/0233634 A1 | * | 8/2015 | Zubrin ............... | H04W 76/10 62/619 |
| 2019/0063824 A1 | * | 2/2019 | Watanabe ........... | F25J 1/005 |
| 2019/0277563 A1 | * | 9/2019 | Costa De Beauregard ........ F25J 1/0242 | |
| 2020/0108371 A1 | * | 4/2020 | Norioka ............. | B01J 23/80 |
| 2021/0071947 A1 | * | 3/2021 | Schwartz ........... | F25J 3/0223 |
| 2021/0102753 A1 | * | 4/2021 | Costa De Beauregard ........ F25J 1/0022 | |

(Continued)

FOREIGN PATENT DOCUMENTS

| | | |
|---|---|---|
| WO | WO 98 36038 | 8/1998 |
| WO | WO 2008 079802 | 7/2008 |

OTHER PUBLICATIONS

Geijsel, J.I. et al., Synergies between LNG and gas to liquids conversion/Synergies entre le GNL et la conversion du gaz en liquides, Int'l Conference and Exhibition on Liquefied Natural Gas, XX, XX, Jan. 1, 2001, PS2-5.01.

Häussinger, P. et al., Hydrogen, 2. Production, Ullmann's Encyclopedia of Industrial Chemistry. Oct. 15, 2011, Wiley-VCH Verlag GmbH & Co. KGaA, Weinheim, Germany ISBN: 978-3-52-730673-2, 1, 43, 44, 306.

(Continued)

*Primary Examiner* — Tam M Nguyen
(74) *Attorney, Agent, or Firm* — Elwood L. Haynes

(57) ABSTRACT

Natural gas liquefaction process in combination with a synthesis gas production process, where the steam derived from the synthesis gas production process is used as a heating source for the implementation of the pre-treatment step for eliminating the impurities liable to freeze during the natural gas liquefaction process.

8 Claims, No Drawings

(56) References Cited

U.S. PATENT DOCUMENTS

2021/0155478 A1* 5/2021 Shrivastava ......... B01D 53/229
2021/0395083 A1* 12/2021 Harale ................... C01B 3/382

OTHER PUBLICATIONS

Sauchuk, J. et al., Enhanced process integration between LNG and GTP plants, Int'l Conference on LNG, vol. $14^{th}$, Mar. 1, 2006, PO-41/1.

International Search Report and Written Opinion for corresponding PCT/FR2017/053100, dated Feb. 13, 2018.

* cited by examiner

SYNTHESIS GAS PRODUCTION PROCESS FOR THE IMPLEMENTATION OF A NATURAL GAS LIQUEFACTION

CROSS REFERENCE TO RELATED APPLICATIONS

This application is a 371 of International PCT Application No. PCT/FR2017/053100, filed Nov. 14, 2017, which claims priority to French Patent Application No. 1660986, filed Nov. 14, 2016, the entire contents of which are incorporated herein by reference.

BACKGROUND

The present invention relates to a process for the liquefaction of a stream of hydrocarbons, such as natural gas, in combination with a process for the production of synthesis gas.

The invention relates to the integration of a process for the liquefaction of natural gas in a process for the production of synthesis gas by superheated steam reforming, partial oxidation or autothermal reforming.

These technologies for the production of synthesis gas sometimes require the use of large amounts of natural gas which are used as feed stream but also as source of heating for the process.

It is also desirable to liquefy natural gas for a certain number of reasons. By way of example, natural gas can be stored and transported over long distances more easily in the liquid state than in the gas form, since it occupies a smaller volume for a given weight and does not need to be stored at a high pressure.

Processes for the generation of synthesis gas generally have, as finished products, hydrogen, carbon monoxide or a mixture of the two (known as oxo gas, indeed even a $H_2/CO/CO_2$ mixture (production of methanol) or a $N_2/H_2$ mixture (production of ammonia). Each of these processes additionally cogenerates more or less superheated steam.

After a metering and optionally compression or decompression unit, the production of synthesis gas generally includes the following stages:

1. A hot desulfurization stage: after a preheating (350-400° C.), all the sulfur-comprising derivatives present in the natural gas are converted into $H_2S$ by catalysis in a hydrogenation (CoMox) reactor. The $H_2S$ is then removed by catalysis (over a ZnO bed, for example).

2. An optional prereforming stage (stage mainly present in the steam reforming units): at high temperature (approximately 500-550° C.) with excess steam. Then, in the presence of catalyst: conversion of the hydrocarbon chains containing at least two carbon atoms into methane with coproduction of carbon monoxide, carbon dioxide ($CO_2$) and hydrogen.

3. Reforming stage, which consists in reacting, at high temperature (850-950° C.), the hydrocarbons with steam in order to produce hydrogen, CO and $CO_2$.

Downstream of the units for the production of synthesis gas, the products generally upgraded are carbon monoxide (CO), hydrogen ($H_2$) or a $H_2/CO$ mixture.

If appropriate, the final stage of the process for the production of synthesis gas can also be a:

Stage of partial oxidation over a catalytic bed (autothermal reformer), which consists in reacting oxygen with hydrocarbons at high temperature (800-1200° C.) in order to produce more CO;

A stage of conversion of CO into $H_2$ in a catalytic reactor in the case of an exhaustive production of hydrogen;

The purification of the synthesis gas produced can then be carried out either by:

Use of a PSA in order to purify the hydrogen-rich stream produced; or

Scrubbing with amines in order to extract the $CO_2$ from the synthesis gas in the cases of production of CO or oxo gas; and Purification in a cold box of the CO-rich stream produced; or Passing the gas produced through a membrane in order to adjust the $H_2/CO$ ratio required for the quality of the oxo gas to be produced.

Furthermore, in a general way, the units for liquefaction of natural gas make it possible to carry out a liquefaction process generally comprising the following three stages:

1. A "pretreatment" which removes, from the natural gas to be liquefied, the impurities liable to freeze ($H_2O$, $CO_2$, sulfur-comprising derivatives, mercury, and the like);

2. Extraction of the heavy hydrocarbons and aromatic derivatives which may freeze during the liquefaction. This stage can take place upstream of or in parallel with the liquefaction;

3. Liquefaction by cooling the natural gas to a cryogenic temperature (typically −160° C.) by virtue of a refrigerating cycle and optionally also accompanied by a withdrawal of the heavy hydrocarbons/aromatic derivatives liable to freeze.

SUMMARY

The inventors of the present invention have developed a solution which makes possible an upgrading of the steam produced and available in excess in the processes for the generation of synthesis gas within the process for the liquefaction of natural gas. This integration between the two processes exhibits numerous advantages of synergies.

DETAILED DESCRIPTION OF THE EMBODIMENTS

A subject-matter of the present invention is a process for the liquefaction of natural gas in combination with a process for the production of synthesis gas, the liquefaction process comprising the following stages:

Stage a): pretreatment of a feed natural gas in order to remove the impurities liable to freeze during the liquefaction process;

Stage b): extraction, from the gas stream resulting from stage a), of a stream enriched in hydrocarbons having more than two carbon atoms;

Stage c): liquefaction of the gas stream depleted in hydrocarbons having more than two carbon atoms resulting from stage b);

the process for the production of synthesis gas comprising the following stages:

Stage a'): desulfurization at a temperature of greater than 350° C. of a natural gas feed stream;

Stage b'): optional prereforming, at a temperature of greater than 500° C., in order to convert the hydrocarbon chains containing at least two carbon atoms of the gas stream resulting from stage a') into methane;

Stage c'): reforming consisting in reacting, at a temperature of greater than 800° C., the gas stream resulting from stage a') or b') with steam in order to produce hydrogen, carbon dioxide and carbon monoxide;

characterized in that the steam resulting from the process for the production of synthesis gas is used as source of heating for the implementation of stage a).

According to other embodiments, another subject-matter of the invention is:

A process as defined above, characterized in that stage a) consists of a pretreatment by adsorption by means of an adsorption system comprising between two and five containers of at least one bed of adsorbent and at least one device for heating and/or cooling an adsorption and/or regeneration stream circulating in said adsorption system and characterized in that the steam resulting from the process for the production of synthesis gas is employed to reheat said regeneration stream.

A process as defined above, characterized in that the steam resulting from the process for the production of synthesis gas is employed to reheat the regeneration stream which has already passed through said adsorption system and to distance it from the dew point.

A process as defined above, characterized in that stage a) consists of a pretreatment by scrubbing with amines by means of a device comprising at least one adsorption column and at least one regeneration column, characterized in that the steam resulting from the process for the production of synthesis gas is employed as heating means for reboiling said regeneration and adsorption columns.

A process as defined above, characterized in that, during stage a'), all the sulfur-comprising derivatives present in the feed gas are converted into $H_2S$ by catalysis in a reactor.

A process as defined above, characterized in that the product $H_2S$ is extracted by catalysis.

A process as defined above, characterized in that the impurities liable to freeze during the liquefaction process which are removed during stage a) comprise the water, the carbon dioxide and the sulfur-comprising derivatives present in the feed gas.

A process as defined above, characterized in that, during stage c), the stream of natural gas depleted in hydrocarbons having more than two carbon atoms resulting from stage b) is liquefied at a temperature of less than $-140°$ C. by means of a unit for the liquefaction of natural gas comprising at least one main heat exchanger and a system for producing cold.

A process as defined above, characterized in that the natural gas feed stream employed in stage a) and the natural gas feed stream employed in stage a') originate from one and the same natural gas feed stream.

A process as defined above, characterized in that the unit for the production of synthesis gas is a unit for the production of hydrogen by steam reforming having a hydrogen production capacity of at least 20 000 $Sm^3$/h.

The stream of hydrocarbons to be liquefied is generally a stream of natural gas obtained from a domestic gas network in which the gas is distributed via pipelines.

The expression "natural gas" as used in the present patent application relates to any composition containing hydrocarbons, including at least methane. This comprises a "crude" composition (prior to any treatment or scrubbing) and also any composition which has been partially, substantially or completely treated for the reduction and/or removal of one or more compounds, including, but without being limited thereto, sulfur, carbon dioxide, water, mercury and certain heavy and aromatic hydrocarbons.

The heat exchanger can be any heat exchanger, any unit or other arrangement suitable for making possible the passage of a certain number of streams, and thus making possible a direct or indirect exchange of heat between one or more liquid coolant lines and one or more feed streams.

Generally, the natural gas stream is essentially composed of methane. Preferably, the feed stream comprises at least 80 mol % of methane. Depending on the source, the natural gas contains quantities of hydrocarbons heavier than methane, such as, for example, ethane, propane, butane and pentane and also certain aromatic hydrocarbons. The natural gas stream also contains nonhydrocarbon products, such as nitrogen (content variable but of the order of 5 mol %, for example) or other impurities, $H_2O$, $CO_2$, $H_2S$ and other sulfur-comprising compounds, mercury and others (0.5 mol % to 5 mol % approximately).

The feed stream containing the natural gas is thus pretreated before being introduced into the heat exchanger. This pretreatment comprises the reduction and/or the removal of the undesirable components, such as, generally, $CO_2$ and $H_2O$ but also $H_2S$ and other sulfur-comprising compounds or mercury.

In order to prevent the latter from freezing during the liquefaction of the natural gas and/or the risk of damage to the items of equipment located downstream (by corrosion phenomena, for example), it is advisable to remove them.

One means which makes it possible to remove the $CO_2$ from the natural gas stream is, example, scrubbing with amines which is located upstream of a liquefaction cycle.

The scrubbing with amines separates the $CO_2$ from the feed gas by scrubbing the natural gas stream with a solution of amines in an absorption column. The solution of amines enriched in $CO_2$ is recovered in the bottom of this absorption column and is regenerated at low pressure in a column for regeneration of the amine (or stripping column).

An alternative to the treatment by scrubbing with amines can be the adsorption by pressure and/or temperature inversion. The advantages of such a process are described below.

This separation process makes use of the fact that, under certain pressure and temperature conditions, some constituents of the gas ($CO_2$ and $H_2O$ in particular) have specific affinities with regard to a solid material, the adsorbent (for example molecular sieves).

The adsorption is a reversible process and it is possible to regenerate the absorbent by lowering the pressure and/or raising the temperature of the adsorbent in order to release the adsorbed constituents of the gas.

Thus, in practice, a system for separation by adsorption consists of several (between two and five) "bottles" containing one or more layers of adsorbents and also appliances dedicated to the heating/cooling of the adsorption and/or regeneration stream.

In comparison with a conventional scrubbing with amines, the pretreatment exhibits a number of advantages.

its Cost;

its simplicity of operation;

the possibility of avoiding a number of services (the contribution of amine or of distilled water).

These advantages are particularly significant for small-sized units for the liquefaction of natural gas (for example producing less than 50 000 tonnes of liquefied natural gas per year).

Its main disadvantage is that of finding the stream necessary for the regeneration (15% of the treated flow rate approximately). By virtue of the integration with the hydrogen production unit, it is possible to regenerate the bottles with the treated gas stream and to return it to the hydrogen production unit (feed stream or fuel system).

This option would not have been possible without integration as it would have meant a significant loss of natural gas.

An exemplary embodiment is illustrated by the following example.

A steam reforming unit with a nominal hydrogen production capacity of approximately 130 000 $Sm^3/h$ is employed. This unit, fed with natural gas, exports steam at two pressure levels:

1. 55 tonnes per hour of high-pressure superheated steam (45 bara approximately) for a temperature of the order of 300° C. (resulting from the stage of reforming the synthesis gas).

2. 35 tonnes per hour of medium-pressure steam (12 bara approximately) (resulting from the stage of prereforming the synthesis gas).

Generally, the steam generated is sent to one or more dedicated network(s) for various users.

By placing a small unit for the production of liquefied natural gas with a capacity of 40 000 tonnes of liquefied natural gas produced per year close to the hydrogen production unit, it is possible to upgrade all or part of the high-pressure steam in this unit and then to return the used steam to the medium-pressure network.

In this case, for example:
- approximately 6 tonnes per hour of steam would be necessary as source of heating for the pretreatment of the natural gas (for example adsorption), located upstream of the liquefier;
- approximately 45 tonnes per hour would be necessary to drive the compressors of the cycle for the production of cold via back pressure steam turbines.

The residual steam is used to vaporize the heavy hydrocarbons extracted from the natural gas liquefier (amount of steam necessary less than 1 tonne per hour) or to reheat the natural gas vapors generated in the storage of liquefied natural gas and/or in the loading bay (amount of steam necessary less than 1 tonne per hour) before they are sent to the fuel network.

This integration makes it possible to limit the number of items of equipment necessary for the natural gas liquefaction unit (and thus to gain in competitiveness).

In the cases where the steam exported is weakly upgraded, the gain with regard to the electrical energy saved by the replacement of the electric motors by steam turbines can be estimated at several million euros with regard to the electrical energy thus saved per year.

In addition, the pressure and temperature level(s) of the steam available vary from one production unit to the other. It is possible to adjust the amounts of steam generated by the hydrogen production unit by modifying the operating conditions or to condense the steam exported in order to recover energy which can, for example, make it possible to produce electricity in a turbine.

It is then possible for the units for the production of synthesis gas and for the liquefaction of natural gas to have in common all of the conveniences of the site, in particular:
  The connection to the natural gas network;
  The metering and optionally pressure reduction/compression station;
  A hot flare and optionally cold liquid network;
  All of the utilities of the site (electricity, cooling circuit, instrumentation air, nitrogen, and the like);
  The feed network.

Furthermore, in the case where the unit for the production of synthesis gas produces hydrogen, it is sometimes required to liquefy all or part of the hydrogen in order to facilitate the transportation or storage thereof, for example. In this case, it is possible to "precool" the hydrogen produced in the natural gas liquefier down to a temperature of −160° C., for example, and then to finish liquefying it in a dedicated unit.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the liquefaction of natural gas in combination with a process for the production of synthesis gas, the liquefaction process comprising the following stages:
  Stage a): pretreatment of a feed natural gas in order to remove the impurities liable to freeze during the liquefaction process;
  Stage b): extraction, from the gas stream resulting from stage a), of a stream enriched in hydrocarbons having more than two carbon atoms;
  Stage c): liquefaction of the gas stream depleted in hydrocarbons having more than two carbon atoms resulting from stage b);
  the process for the production of synthesis gas comprising the following stages:
  Stage a'): desulfurization at a temperature of greater than 350° C. of a natural gas feed stream;
  Stage b'): optional prereforming, at a temperature of greater than 500° C., in order to convert the hydrocarbon chains containing at least two carbon atoms of the gas stream resulting from stage a') into methane;
  Stage c'): reforming consisting in reacting, at a temperature of greater than 800° C., the gas stream resulting from stage a') or b') with steam in order to produce hydrogen, carbon dioxide and carbon monoxide;
  wherein the steam resulting from the process for the production of synthesis gas is used as source of heating for the implementation of stage a); and wherein stage a) comprises a pretreatment by adsorption by means of an adsorption system comprising between two and five containers of at least one bed of adsorbent and at least one device for heating and/or cooling an adsorption and/or regeneration stream circulating in said adsorption system and wherein the steam resulting from the process for the production of synthesis gas is employed to reheat said regeneration stream.

2. The process as claimed in claim 1, wherein the steam resulting from the process for the production of synthesis gas is employed to reheat the regeneration stream which has already passed through said adsorption system and to distance it from the dew point.

3. The process as claimed in claim 1, wherein, during stage a'), all the sulfur-comprising derivatives present in the feed gas are converted into $H_2S$ by catalysis in a reactor.

4. The process as claimed in claim 3, wherein the product $H_2S$ is extracted by catalysis.

5. The process as claimed in claim 1, wherein the impurities liable to freeze during the liquefaction process which are removed during stage a) comprise the water, the carbon dioxide and the sulfur-comprising derivatives present in the feed gas.

6. The process as claimed in claim 1, wherein, during stage c), the stream of natural gas depleted in hydrocarbons having more than two carbon atoms resulting from stage b) is liquefied at a temperature of less than −140° C. by means of a unit for the liquefaction of natural gas comprising at least one main heat exchanger and a system for producing cold.

7. The process as claimed in claim 1, wherein the natural gas feed stream employed in stage a) and the natural gas feed stream employed in stage a') originate from one and the same natural gas feed stream.

8. The process as claimed in claim 1, wherein the unit for the production of synthesis gas is a unit for the production of hydrogen by steam reforming having a hydrogen production capacity of at least 20 000 $Sm^3/h$.

* * * * *